US006322439B1

(12) United States Patent
David

(10) Patent No.: US 6,322,439 B1
(45) Date of Patent: Nov. 27, 2001

(54) MULTI-DIRECTIONAL VENT HATCH

(76) Inventor: Robert C. David, 714 Augusta Dr., Sun City Center, FL (US) 33573

( * ) Notice: Subject to any disclaimer, the term of this patent is extended or adjusted under 35 U.S.C. 154(b) by 0 days.

(21) Appl. No.: 09/661,336
(22) Filed: Sep. 14, 2000
(51) Int. Cl.[7] .................................................. B60H 1/30
(52) U.S. Cl. ............................................ 454/78; 454/145
(58) Field of Search ................................ 454/78, 81, 82, 454/134, 136, 145

(56) References Cited

U.S. PATENT DOCUMENTS

| 44,349 | * | 9/1864 | Sinclair . | |
|---|---|---|---|---|
| 5,797,791 | * | 8/1998 | Humphrey et al. | 454/134 |
| 6,106,385 | * | 8/2000 | Humphrey et al. . | |

* cited by examiner

Primary Examiner—Harold Joyce
(74) Attorney, Agent, or Firm—Ronald E. Smith; Smith & Hopen, P.A.

(57) ABSTRACT

A hatch for venting enclosed spaces has at least one carriage slideably mounted on a circular track so that the hatch may be opened in any direction to provide maximal ventilation. The circular track has a "T"-shaped cross-section that is slideably engaged by the carriage. The carriage carries a lockable hinge that interconnects the carriage and a hatch door. In operation, the carriage is moved around the track until the hatch door is oriented with respect to wind so that an optimal amount of air is directed by the hatch door into the enclosed space to be ventilated. The carriage can be locked into position at any preselected point on the track. The lock is spring-loaded and it is therefore easy to unlock the carriage and re-position it when the wind changes directions.

7 Claims, 3 Drawing Sheets

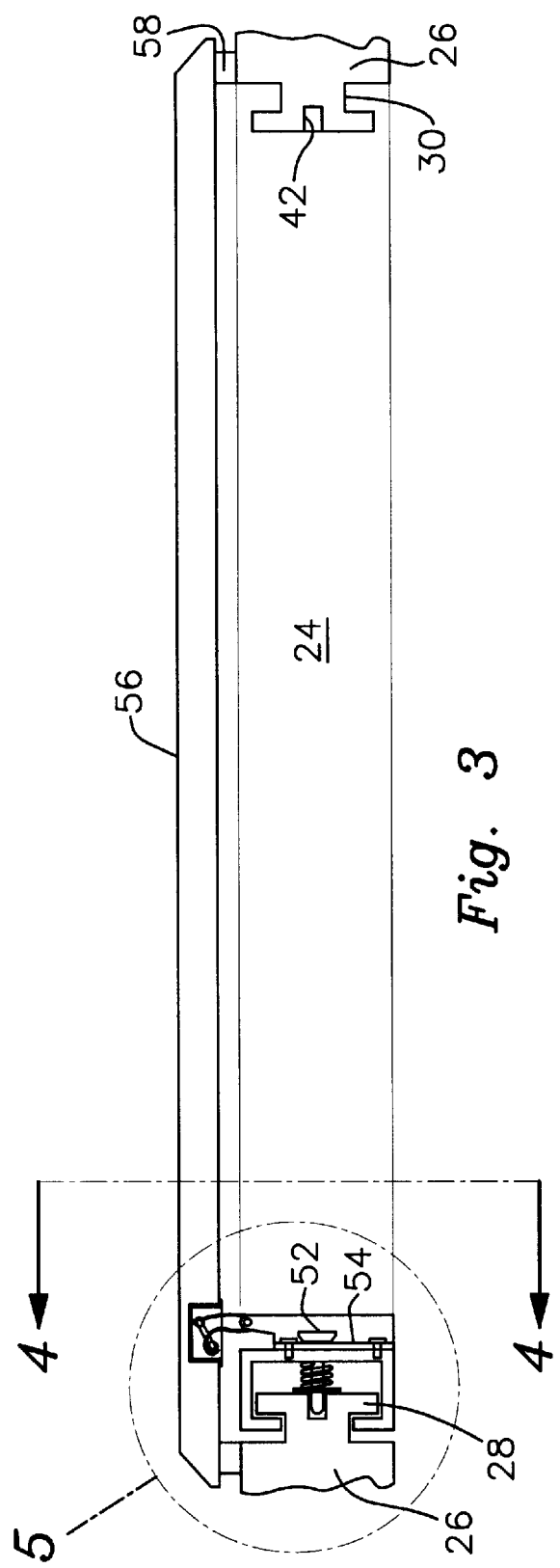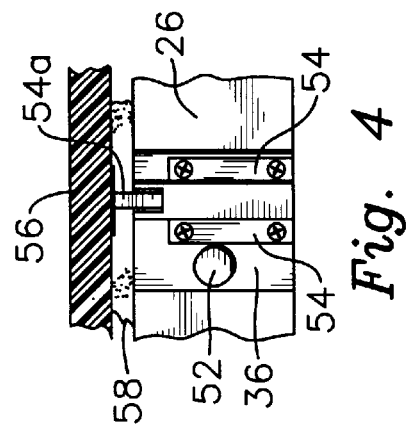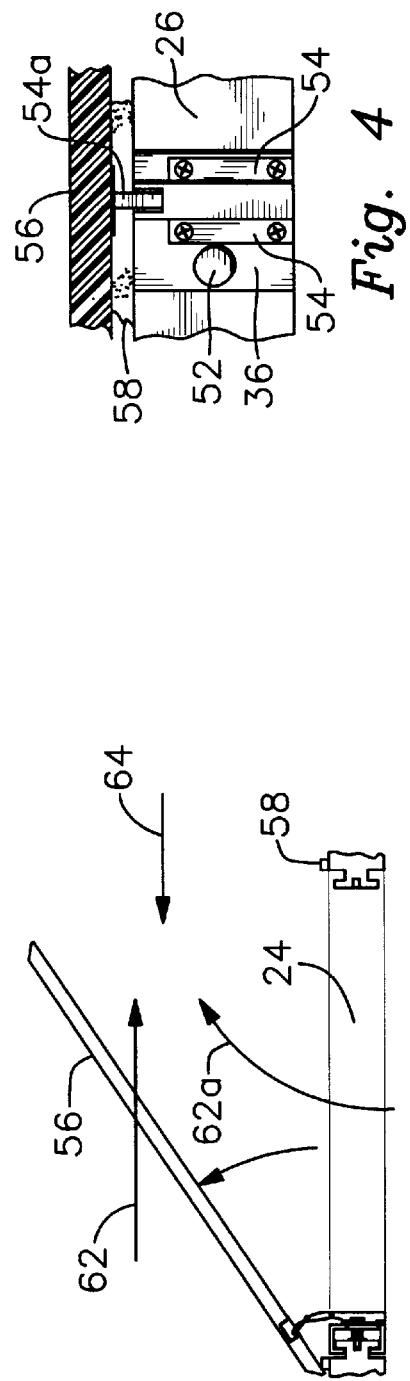

MULTI-DIRECTIONAL VENT HATCH

BACKGROUND OF THE INVENTION

1. Field of the Invention

This invention relates, generally, to hatches for venting the interiors of boats, motor vehicles, and other enclosed spaces. More particularly, it relates to a hatch that can be opened in any direction so that maximum advantage may be taken of wind conditions.

2. Description of the Prior Art

Vent hatches are provided on boats, motor homes, and the like for the purpose of enhancing air circulation in enclosed spaces. Some hatches are hinged and open like a door; however, if the wind is not blowing directly into the opening, maximum ventilation of the enclosed space is not achieved. Some hatches are called wind scoops because they are permanently open. These hatches are also not completely effective if the wind is not blowing directly into the scoop. Other hatches are mounted for up and down movement. These hatches can capture wind from all directions, but they must be raised and lowered with a crank means.

U.S. Pat. No. 3,524,400 to Magi, U.S. Pat. No. 4,434,740 to Childs, and U.S. Pat. No. 5,339,759 to Peabody disclose wind scoop systems of the type that are permanently fixed in one position so that maximum ventilation is achieved only when air moves directly into the scoop. U.S. Pat. No. 3,103,870 to Steiner, and U.S. Pat. No. 4,448,112 to Söderberg disclose multi-directional vents of the type that must be cranked up or down. This type of vent relies on a screw and takes a long time to open or close if the screw threads have a low pitch. However, if a greater pitch is used to reduce the time and effort required to open and close such a vent, then the lid of the vent tends to gradually close itself as a thread-engaging means "walks down" the thread in response to environmentally-caused vibrations.

What is needed, then, is a screw-free vent hatch that can capture air movement from any direction so that maximum ventilation of an enclosed space may be achieved. A need also exists for a vent hatch that can be opened and closed quickly without using a crank means.

However, in view of the prior art considered as a whole at the time the present invention was made, it was not obvious to those of ordinary skill in the pertinent art how the identified needs could be fulfilled.

SUMMARY OF THE INVENTION

The longstanding but heretofore unfulfilled need for a hingedly mounted vent hatch that maximizes ventilation independently of wind direction is now met by a new, useful, and nonobvious venting means adapted for ventilating an enclosed space of the type formed by a floor, a roof, and surrounding side walls. The novel apparatus includes a suitable opening formed in the roof of an enclosed space. A peripheral edge of the opening has a thickness predetermined by a thickness of the roof. A circular track is disposed in overlying relation to the peripheral edge and a carriage is slideably engaged to the circular track; the, carriage is positionable in any rotational position of adjustment relative to the circular track. A closure means selectively closes the opening. A hinge means is mounted on the carriage for interconnecting the closure means and the carriage.

If the opening is of rectangular or other noncircular shape, the circular track is affixed thereto, thereby allowing the hinge mechanism to travel 360°.

Accordingly, the carriage and hence the closure means is positionable in any preselected position relative to the circular track so that the closure means may be opened to direct a maximum amount of wind into the enclosed space regardless of wind direction.

The novel structure further includes a carriage locking means for locking the carriage into any preselected position about the circular track. The carriage locking means includes a plurality of blind bores formed in the circular track, each of which has an axis of symmetry coincident with a ray extending from a center of the opening. In a preferred embodiment, the circular track is "T"-shaped and the carriage has a flat front wall, a pair of legs that extend in a common direction from opposite sides of the flat front wall in normal relation thereto, and a pair of track-engaging members that respectively extend from the legs in normal relation thereto and toward one another to capture the "T"-shaped circular track.

A throughbore is formed in the main body of the carriage; it has an axis of symmetry coincident with a ray extending from a center of the opening. A lock member is slideably disposed in the throughbore and a bias means urges the lock member radially outwardly. The lock member is dimensioned and configured for sliding reception within any preselected blind bore of the plurality of blind bores. In this way, the carriage is held against movement along the circular track when the lock member is slideably disposed within a preselected blind bore and manual retraction of the lock member from the preselected blind bore against the bias enables repositioning of the carriage about the circular track so that the closure means may be re-positioned in response to shifts in wind direction.

The hinge means is a lockable hinge means so that the closure means is lockable into any preselected position of adjustment.

If the closure means is substantially larger than the opening, a depression is formed in the roof in circumscribing relation to the opening to accommodate a peripheral edge of the closure means when it is open. Moreover, a strip of weatherstripping may be disposed in circumscribing relation to the opening to enhance sealing thereof by said closure means.

It is therefore understood that a primary object of this invention is to provide a hingedly mounted vent means that can be opened in any rotational direction so that it can capture maximum airflow from any direction.

Another object is to provide a multi-directional vent hatch that can be locked into an open position.

Still another important object is to provide such a vent hatch in a durable, rugged form so that it can withstand harsh environments.

Yet another important object is to enable the hatch to open "back to" the wind, thus creating a venturi-effect for ventilation.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a sectional view taken along line 2—2 in FIG. 1;

FIG. 3 is an enlarged view of the structure depicted in FIG. 2, but showing the hatch in a closed position;

FIG. 4 is a view taken along lines 4—4 in FIG. 3;

DETAILED DESCRIPTION OF THE PREFERRED EMBODIMENT

Figure 1:
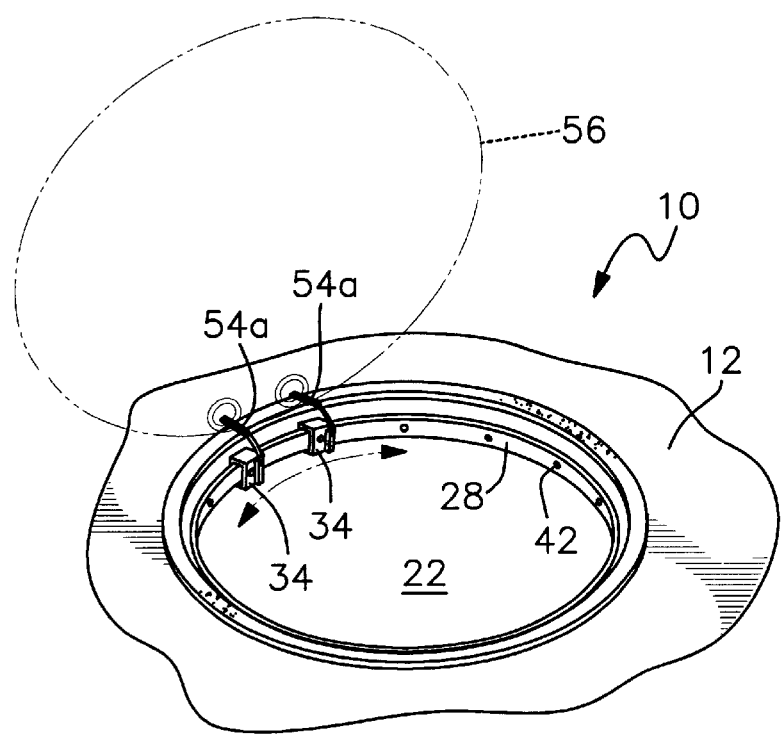
FIG. 1 is a perspective view of the novel multi-directional hatch when in an open configuration.

Referring now to FIG. 1, it will there be seen that the reference number 10 denotes an illustrative embodiment of the present invention as a whole. Reference numeral 12 denotes a roof of a vehicle such as a sports utility vehicle, the deck of a boat or a ship, the roof of a permanent structure, or the like. The point is that the novel structure may be employed in connection with any enclosed space having a floor, a roof, and enclosing side walls.

An opening 22 of any predetermined configuration is formed in deck or roof 12; the thickness of the deck or roof determines the height of peripheral walls 24 (see FIG. 2) that circumscribe said opening.

Figure 5:
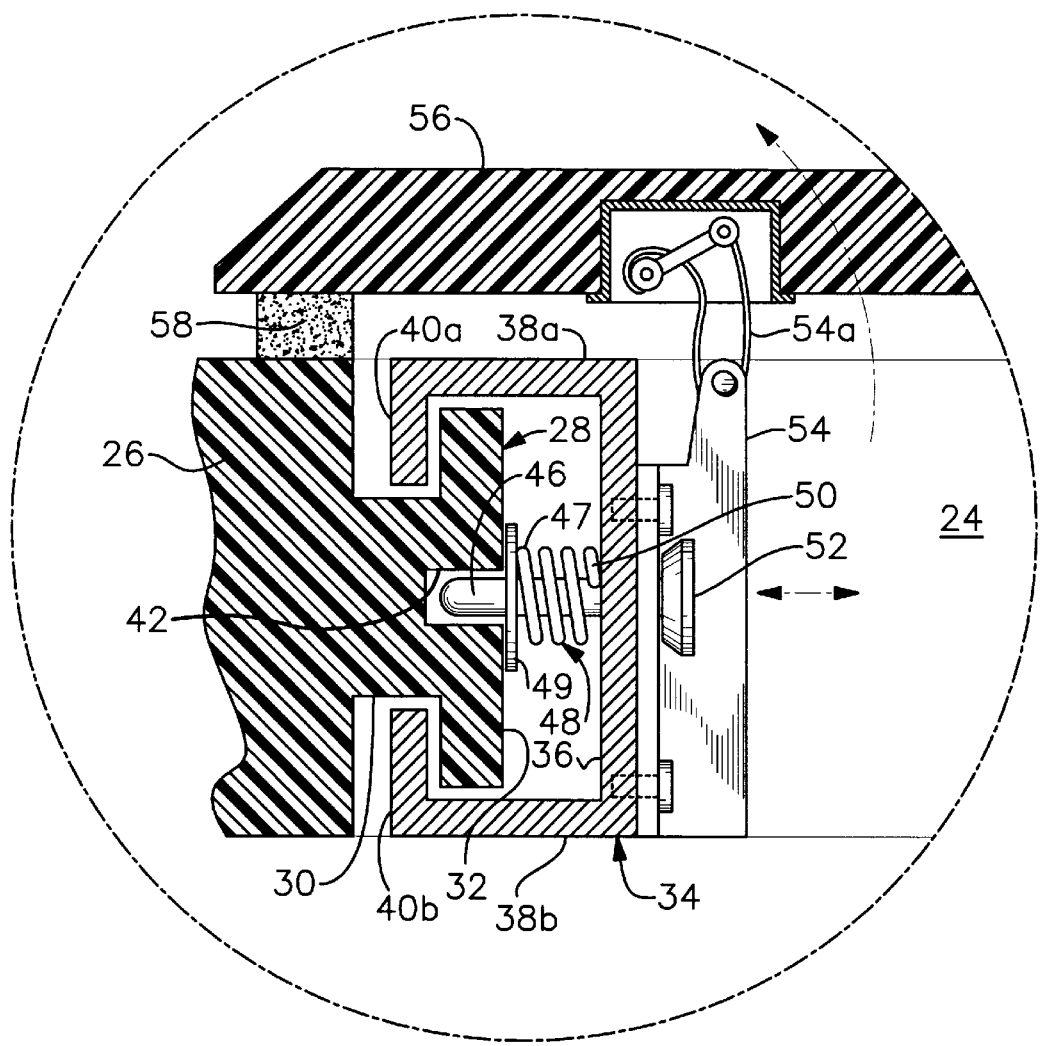
FIG. 5 is an enlarged view of the encircled part of FIG. 3 that is denoted by the reference numeral 5.

A liner 26 (FIGS. 3–5) is secured to and overlies peripheral walls 24. It has a height substantially equal to the thickness of deck or roof 12. As best illustrated in FIG. 5, track 28 extends radially inwardly from liner 26. In the preferred embodiment it has a generally "T"-shaped cross section. More particularly, track 28 includes an annular base 30 that projects radially inwardly relative to liner 26 and a flat top wall 32. Flat top wall 32 and annular base 30 collectively form a "T" shape when seen in section as best depicted in FIG. 5.

Figures 6, 7:
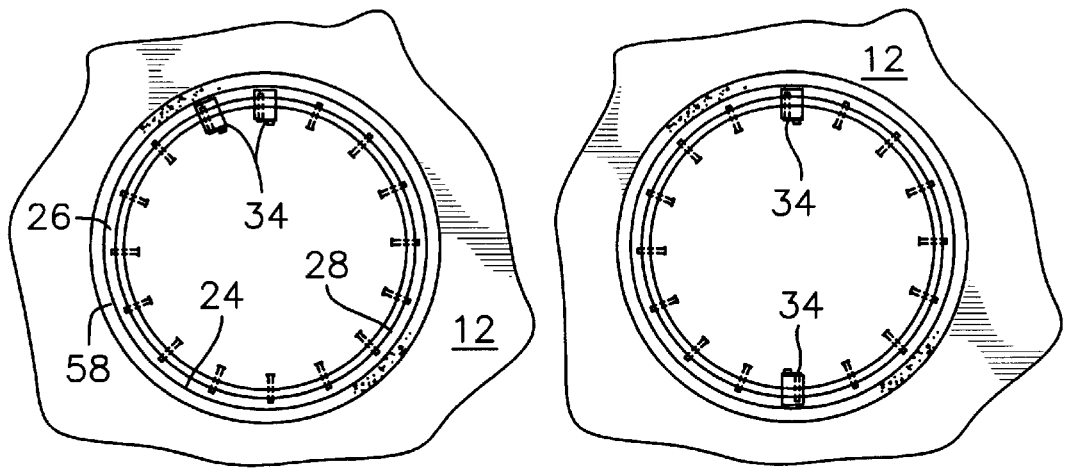
FIG. 6 is a top plan view of the novel structure with the carriage members in closely spaced circumferential relation to one another.
FIG. 7 is a top plan view of the novel structure with the carriage members spaced in diametrically opposed relation to one another.

Carriage 34, of which there are preferably two as indicated in FIGS. 1, 6, and 7, has a flat front wall 36 (see FIG. 5), sidewalls 38a, 38b, and back walls 40a, 40b that extend toward one another, thereby collectively slidingly capturing track 28. An embodiment having only one carriage is also within the scope of this invention, it being understood that two carriages are provided primarily for strength and stability purposes. Moreover, track 28 is not restricted to having a "T"-shaped cross-section and therefore carriage 34 need not have the depicted shape. For example, track 28 could take the form of a bulbosity and carriage 34 would then have a bulbous cavity for slideably receiving said bulbosity. The only requirement is that carriage 34 slideably engage a track that circumscribes opening 22.

A plurality of circumferentially spaced apart blind bores, collectively denoted 42 (see FIG. 5), is formed in liner 26. Each blind bore has a predetermined depth that is preferably less than the radial thickness of liner 26 and has an axis of symmetry coincident with a ray that extends from a center of opening 22.

A throughbore is formed in the center of front wall 36 of carriage 34 and a locking plug 46 is slideably disposed within said throughbore. A leading end 47 of bias means 48 bears against washer 49 that is affixed to plug 46 and which circumscribes blind bore 42. Trailing end 50 of said bias means bears against front wall 36. In this way, bias means 48 urges locking plug 46 into blind bore 42 when said locking plug and blind bore are in alignment with one another, thereby preventing movement of carriage 34 along the extent of track 28. Head 52 of locking plug 46 is grasped and pulled radially inwardly to overcome the bias of bias means 48 to withdraw locking plug 46 from blind bore 42 when it is desired to move carriage 34 along the extent of track 28. In this way, carriage 34 is selectively slidingly positionable along the extent of track 28, there being as many positions for said carriage as there are blind bores 42.

A lockable hinge means 54 is secured to front wall 36 of carriage 34 and interconnects said carriage to a closure means 56 that is configured and dimensioned to close opening 22.

A conventional gasket 58 or strip of weatherstripping circumscribes opening 22 to provide a seal when closure means 56 is in closing relation to said opening 22.

It may be impractical to open closure means 56 directly into the wind if the wind is strong because the wind pressure could break hinge means 54 unless it is especially designed to withstand high forces. For example, the wind might be too strong if the closure means is mounted on a vehicle traveling at high speeds or on a sea vessel in a storm. Rather than equip the novel structure with an expensive hinge means, it is preferred to use a hinge means of normal strength and to avoid opening the closure means directly into high winds. Instead, in high wind conditions, carriage 34 is rotated along track 28 and locked into position so that closure means 56 is opened so that the opening is one hundred eighty degrees away from the wind direction. In this way, air is drawn from the enclosed space by the venturi effect as indicated by directional arrows 62, 62a, in FIG. 2. If the wind speed is not high, then the closure means is positioned directly into the wind as indicated by directional arrow 64 in FIG. 2 if maximal air circulation is desired.

The novel multi-directional vent hatch can be built into a boat or vehicle or other enclosed space at the time of manufacturing. It may be also retrofit into any structure where an opening 22 may be cut into a roof 12. Significantly, it is a very simple matter to pull on head 52 of locking plug 46 and to reposition closure means 56 whenever the wind changes direction. Moreover, the use of a conventional, lockable hinge means 54 avoids the need for hand cranks, screws, or other opening and closing means that slow down the opening and closing of closure means 56.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A venting means adapted for ventilating an enclosed space of the type formed by a floor, a roof, and surrounding side walls, comprising:

an opening formed in said roof, a peripheral edge of said opening having a thickness predetermined by a thickness of said roof;

a circular track disposed in overlying relation to said peripheral edge;

a carriage slideably engaged to said circular track, said carriage being positionable in any position of adjustment relative to said circular track;

carriage locking means for locking said carriage into any preselected position about said circular track;

said carriage locking means including a plurality of circumferentially spaced apart blind bores formed in said circular track, each of said blind bores having an axis of symmetry coincident with a ray extending from a center of said opening;

a closure means for said opening; and a hinge means mounted on said carriage for interconnecting said closure means and said carriage;

whereby said carriage is positionable in any preselected position relative to said circular track so that said closure means may be opened to direct a maximum amount of wind into said enclosed space.

2. The venting means of claim 1, wherein said circular track is "T"-shaped.

3. The venting means of claim 2, wherein said circular track is "T"-shaped. of legs that extend in a common direction from opposite sides of said flat front wall in normal relation thereto, and a pair of track-engaging members that respectively extend from said legs in normal relation to said legs and toward one another to capture said "T"-shaped circular track.

4. The venting means of claim 3, said carriage locking means further comprising:

a throughbore formed in said front wall of said carriage;

said throughbore having an axis of symmetry coincident with a ray extending from a center of said opening;

a lock member slideably disposed in said throughbore; and a bias means for urging said lock member radially inwardly;

said lock member being dimensioned and configured for sliding reception within any preselected blind bore of said plurality of blind bores;

whereby said carriage is held against movement along said circular track when said lock member is slideably disposed within a preselected blind bore; and whereby manual retraction of said lock member from said preselected blind bore against said bias means enables repositioning of said carriage about said circular track so that said closure means may be re-positioned in response to shifts in wind direction.

5. The venting means of claim 1, wherein said hinge means is a lockable hinge means so that said closure means is lockable into any preselected position of adjustment.

6. The venting means of claim 5, wherein said closure means is a hatch door configured and dimensioned to close said opening.

7. The venting means of claim 1, further comprising a strip of weatherstripping disposed in circumscribing relation to said opening to enhance sealing of said opening by said closure means.

* * * * *